United States Patent [19]

Sukkar

[11] Patent Number: 4,614,530

[45] Date of Patent: Sep. 30, 1986

[54] STEP GRADIENT PHOTOCHROMIC GLASS BODY AND PROCESS

[76] Inventor: Mary H. Sukkar, 2250 E. 25th Pl., Tulsa, Okla. 74114

[21] Appl. No.: 682,905

[22] Filed: Dec. 18, 1984

Related U.S. Application Data

[60] Continuation-in-part of Ser. No. 428,403, Sep. 29, 1982, abandoned, which is a division of Ser. No. 240,302, Mar. 4, 1981, abandoned.

[51] Int. Cl.⁴ ............................................. C03C 4/06
[52] U.S. Cl. .................................... 65/30.11; 501/13
[58] Field of Search ................ 65/30.11, 30.1, 30.13; 501/13; 428/410; 350/354; 430/341, 346, 348, 962, 352

[56] References Cited

U.S. PATENT DOCUMENTS

| | | | |
|---|---|---|---|
| 3,617,316 | 11/1971 | Suzuki | 501/13 |
| 3,725,028 | 4/1973 | Cramer | 65/29 X |
| 4,148,661 | 4/1979 | Kerko | 501/13 |

Primary Examiner—Kenneth M. Schor

[57] ABSTRACT

A step gradient photochromic glass body is produced by illuminating a selected region of a photochromic glass during isothermal heat treatment with light of a specified energy and intensity while shielding the rest of the glass. The regions of glass exposed to this light during heat treatment are arrested in the development of their photochromic properties, while those regions which are simultaneously shielded from light develop their photochromic properties normally. The light gradient across the glass body during heat treatment is effective to provide a similar gradient in photochromic properties thereacross.

2 Claims, 3 Drawing Figures

U.S. Patent  Sep. 30, 1986  4,614,530
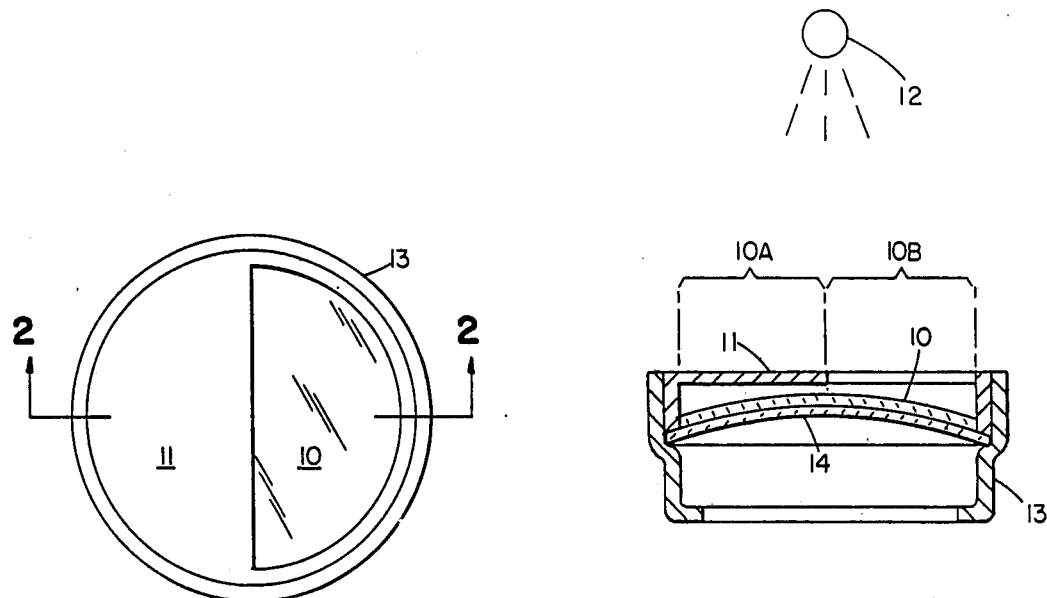
FIG 1
FIG 2
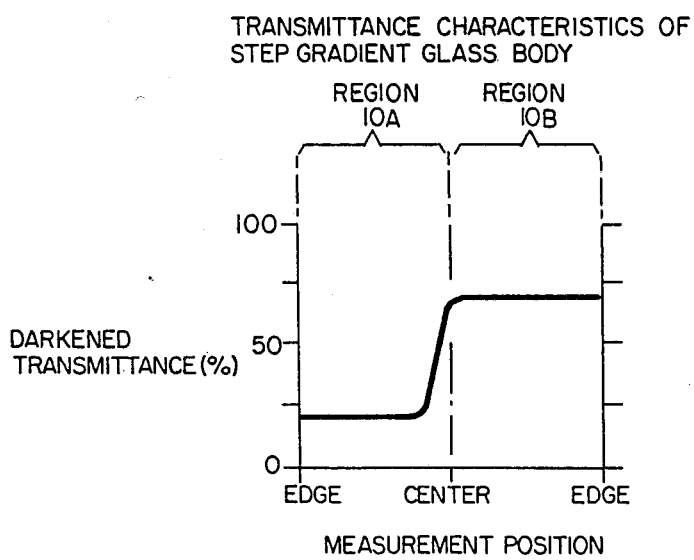
FIG 3

STEP GRADIENT PHOTOCHROMIC GLASS BODY AND PROCESS

RELATED APPLICATIONS

This is a continuation-in-part of Ser. No. 428,403 filed Sept. 29, 1982 and now abandoned, which was a division of Ser. No. 240,302, filed Mar. 4, 1981 and now abandoned.

BACKGROUND OF THE INVENTION

A gradient photochromic glass article is a glass article exhibiting a gradient in photochromic properties thereacross. One example is a photochromic glass article having a first region exhibiting photochromic properties normal for a photochromic glass and a second region exhibiting photochromic properties which are at least substantially less developed than those of the first portion. Often the second portion is non-photochromic.

A number of methods for producing gradient photochromic glasses are known. Canadian Pat. No. 739,404, for example, describes a method wherein potentially photochromic glass is heat treated in a partitioned lehr having a high temperature zone and a low temperature zone. Alternately, the glass is partly encased in a refractory block during heating. Such heat treatments establish a temperature gradient across the glass which is effective to provide a gradient in photochromic properties thereacross. Thus, potentially photochromic glass in the high temperature zone of the lehr reaches a temperature sufficient to develop photochromic properties therein while the glass in the low temperature zone does not.

Similarly, U.S. Pat. Nos. 4,036,624 and 4,101,302 describe a furnace specifically designed to provide controlled graded heating. To achieve a photochromic gradient, the temperature profile of the furnace is designed so that when a glass body is heat treated, those regions of the glass where photochromism is desired are heated at a high enough temperature to develop their photochromic properties while those regions where an absence of photochromism is desired are kept cool.

A related method for producing gradient photochromic glass is described is German Patentschrift No. 2,125,232. According to that method, a continuous sheet of potentially photochromic glass is drawn past heating means which selectively heat only part of the width of the glass sheet. The heated width develops photochromic properties whereas the remainder of the sheet width does not.

U.S. Pat. No. 3,419,370 teaches a preparation of photochromic lenses by diffusing silver ions into the surface layer of a base glass and then exposing the articles to a specified heat treatment. A gradient in photochromic properties across the glass body is attainable by varying the time and/or temperature at different portions of the glass body exposed to an ion exchange medium. According to this patent the ion exchange bath contains, in all instances, silver ions (see Table 2 of the patent). The gradient in photochromic properties is achieved by causing or allowing different concentrations of silver ions to diffuse into the glass.

This method for producing gradient photochromic glass bodies is cumbersome because of the geometry and care necessary to avoid any variations in silver ion concentration, temperature or time of heat treatment which may produce undesirable irregularities in photochromic properties within the glass body.

One method recently developed for the production of gradient photochromic ophthalmic lens blanks comprises subjecting potentially photochromic glass lens blanks to a heat treatment while maintaining part of the lens blank in proximity to a quantity of evaporable liquid contained in or supported by a porous refractory carrier material. The heat treatment is carried out at a temperature sufficient to develop photochromic properties in the potentially photochromic glass; however, vapor generated by the evaporable liquid during heat treatment maintains the part of the lens blank in proximity thereto at temperatures below that required for full photochromic development. Thus, a gradient photochromic ophthalmic lens blank is provided.

Certain disadvantages arise in the production of gradient photochromic ophthalmic lens blanks by the above described method. One major disadvantage is that porous refractory carrier materials of the kind best suited for controlled vapor release are subject to deterioration and breakage due to the adverse physical and chemical effects of repeated thermal cycling in the presence of liquid.

A very important requirement of any glass product intended for ophthalmic use is uniformity with respect to clarity, color and photochromic response. Gradient photochromic ophthalmic lens blanks must meet a further requirement of uniformity in that the quality (relative sharpness) and position within the lens blank of the photochromic gradient must be reproducible. In the vapor process, it appears that rather minor variations in refractory carrier porosity and/or liquid absorption may produce variability in the gradient photochromic product.

U.S. Pat. No. 4,072,490 teaches a method for producing photochromic lenses involving the use of an apparatus with a heat sink at one end which induces a thermal gradient in the lens. The region of the lens in contact with the heat sink remains cooler than the rest of the lens for a sufficient period of time and the development of its photochromic properties are retarded. Hence, the finished product is a gradient photochromic lens.

This review of the patent literature indicates that the art of introducing graded photochromism in glass bodies is essentially limited to processes that rely on the maintenance of a temperature gradient across the glass body during heat treatment. All these processes have the same inherent limitations and problems, such as the inability to precisely control, much less choose at will, certain desirable temperature gradients (e.g. uniform step or steep gradients in low thermal conductivity materials). Another problem with thermal gradient processes is that precautions may be necessary to avoid the buildup of thermally induced stresses in the glass body due to the presence of temperature gradients. As can be deduced from U.S. Pat. Nos. 4,036,624 and 4,101,302, a temperature gradient on the order of 15° C./cm is necessary to achieve distinguishable photochromic gradients in glass bodies.

It is the principle object of the present invention to provide a process for producing a step gradient photochromic glass body not possible with thermal gradient processes which are inherently limited to ramp gradients.

It is a further object to provide a process for producing a gradient photochromic glass body which is not subject to the other above-described disadvantages.

It is a further object to provide a process which produces a gradient glass body of improved uniformity with respect to gradient quality.

Other objects and advantages of the invention will become apparent from the following description and examples thereof.

SUMMARY OF THE INVENTION

In accordance with the present invention, a step gradient photochromic glass body is produced by illuminating a selected portion of a silver halide-containing glass body with light of a sufficient energy and intensity (see below) during isothermal heat treatment at a temperature and time sufficient to develop the photochromic properties of the glass. The region of the glass not exposed to light develops its photochromic properties normally, while the irradiated portion is arrested or partially arrested in the development of its photochromic properties. A steep gradient in photochromic properties is thereby produced between adjoining regions, in which each region of the glass body has a substantially different transmittance value which is uniform within each region.

The main operating principle behind this invention is that the degree to which photochromic properties are developed or arrested in a silver halide-containing glass body is dependent on the intensity and wavelength of light to which it is exposed during heat treatment at a temperature at which its photochromic properties can be modified. Thus, this invention also allows for the precise control of photochromic properties in glass bodies by illuminating the glass body during isothermal heat treatment in a manner exactly similar to the photochromic gradient desired.

BRIEF DESCRIPTION OF THE DRAWING

FIG. 1 of the drawing consists of a top plan view of a step gradient photochromic glass body on a sample holder. Step gradient photochromic glass body 10 (which has already been subjected to isothermal heat treatment under illumination) is positioned horizontally within a sample holder 13. Region 10A of glass body 10 exhibits photochromic properties normal for the photochromic glass from which it was made, whereas Region 10B exhibits reduced photochromic response or is non-photochromic. The position of the half cover 11 on top of Region 10A of the glass body prevents a region of the glass body from recieving light and allows the glass underneath to develop its photochromic properties normally.

FIG. 2 is an elevational view in cross-section of the glass body and sample holder taken along line 2—2 of FIG. 1. The sample holder 13 shown provides mechanical support for glass body 10 during isothermal heat treatment. Region 10B of glass body 10 is illuminated by light source 12 and Region 10A of the glass body is shielded by half cover 11, as indicated.

In operation, the silver halide-containing glass body, sample holder and half cover are introduced into a furnace which is then heated to an elevated temperature sufficient to develop photochromic properties in the glass. Once this temperature is attained, light source 12 is turned on and a selected portion is illuminated during isothermal heat treatment, as indicated schematically by Region 10B of glass body 10 in the illustration, while Region 10A is shielded.

While the glass in Region 10A is developing its photochromic properties normally, the light introduced to Region 10B prevents or retards the development of its photochromic properties. During cooling, light input into Region 10B is maintained to prevent the development of any photochromism before completion of the process.

FIG. 3 of the drawing illustrates schematically the light transmitting characteristics of the step gradient photochromic glass body 10. FIG. 3 is a graph of light transmittance through glass body 10 as a function of the position of measurement along the body. The type of gradient in transmittance shown here is steep, characteristic of a step gradient photochromic glass body in which the transmittance changes abruptly from one region to the next and is substantially different (upon visual examination) in each region and generally uniform within the region (i.e. color variations are so small that they cannot be detected by the naked eye). However, this illustration is a schematic of one. of many possible types of gradients attainable with this process. In principle, any desired gradient in photochromic properties can be provided according to this predetermined invention.

DETAILED DESCRIPTION

The glass to be treated in accordance with the invention may be either photochromic or potentially photochromic. By potentially photochromic is meant a glass which contains the constituents required for photochromic properties development such as silver, one or more halogens (Cl, Br and I), and copper, cadmium or the like, but which has not been subjected to heat treatment to develop photochromic properties therein. Many glasses which are not photochromic as formed, but which may be rendered photochromic by a suitable heat treatment, are known.

The isothermal heat treatment utilized to convert the glass body to a gradient photochromic product in this invention is carried out at a temperature sufficient to develop the photochromic properties of the glass. If the glass body is already photochromic, an initial heat treatment somewhat greater than the softening point of the glass may be desired in order to allow the silver halides to re-dissolve in the glass. Any residual photochromism can be "erased" or diminished by exposure to light of a high enough energy and intensity to dissociate one or more of the silver halides present in the glass (see below) during this initial heat treatment. Temperatures in the range of 400°–1000° C. and times in the range of 3 minutes–24 hours at these temperatures are typically used to impart photochromic properties for a wide range of photochromic glasses and should therefore be useful for treating some of the various types of photochromic glasses suitable for the formation of gradient photochromic glass bodies.

The light source to be used during the isothermal heat treatment must supply light of a high enough energy and intensity to arrest or partially arrest (to any degree desired for a particular application) the development of photochromic properties within the glass. Depending on the particular silver halide content of the glass (i.e. which usually includes one or more of the constituents AgCl, AgBr or AgI), wavelengths of light ranging from the lower limit of the visible to ultraviolet at intensities in the vicinity of commercial light bulbs are sufficient to retard or prevent the development of photochromic properties. The energies of light necessary for this process must be sufficiently high to cause dissociation of the silver halide(s) contained in the glass. The dissociation energies for the silver halides commonly found in photochromic glasses are approximately the same as those which cause darkening in glasses which contain these constituents, i.e. they range from ~6500 Å for AgI to ~4000 Å for AgCl, with AgBr lying somewhere in between at ~5500 Å. Thus, the introduction of higher wavelength radiation (i.e. greater than ~6500 Å) during isothermal heat treatment will not cause silver halide dissociation in the glass and hence will not result in a retardation of the development of the glass photochromic properties.

To minimize penumbras which will produce a corresponding penumbra or "fuzziness" in the photochromic properties between the low and high transmittance regions of the glass body, a point light source such as a laser may be used. The use of such a light source during isothermal heat treatment (e.g. in a raster scanning mode) further enhances the abruptness of step gradients in photochromic properties produced in the glass body.

The invention may be further understood by reference to the detailed following example.

A lens from a pair of commercial photochromic sunglasses was selected for heat treatment. The furnace used for the best treatment of the glass body was a conventional resistance wound model, but with a window on top to allow light input within. The furnace tube (window material) was constructed from quartz which transmits the whole range of wavelengths of light of interest for this process. The light source was a 40 watt incandescent bulb which was positioned above the window of the furnace. This light source provides white light over at least the lower to middle range of energies necessary for most silver halides to dissociate but very little light near 4000 Å which is necessary for AgCl dissociation.

The glass body was placed on a sample holder and a selected portion (approximately half) was positioned under the window, leaving the rest to be shielded from the light source. The glass body was heated to 624° C. which was sufficient to soften the glass. During the heating period, the window was kept covered to allow the silver halides to re-dissolve in the glass. Once the furnace reached the maximum temperature, the cover on the window was removed and the portion of the glass body underneath the window was exposed to the light source. Heat input into the furnace was immediately lowered and the glass body was then cooled to room temperature and removed for examination.

The overall transmittance of the lens after the heat treatment was somewhat lower than before heat treatment, as readily apparent from a visual comparison with the second unused lens from the pair of sunglasses. A definate gradient in both overall transmittance and hue across the lens started to appear after a few minutes exposure to sunlight which grew steadily sharper with time. The gradient was sharp except in the vicinity of the boundary between the low and high transmittance regions. This lack of clarity in photochromic properties in the boundary is probably attributable to penumbra effects of light input into the furnace due to the furnace window boundary. Ways to minimize these effects which were not used in the present example have been discussed above.

Once the glass body was removed from the sunlight, the photochromic gradient was observed to fade fairly rapidly except in the last stages. To speed up the recovery process and confirm that the newly developed photochromic properties were still reversible, the glass body was reheated for 10 minutes at 200° C. (well below the softening point of the glass) which completely erased the photochromic gradient. Upon re-exposure to sunlight, the photochromic gradient quickly returned.

This experiment demonstrates that light may be used to locally control photochromic properties during heat treatment, making extremely steep step gradients in photochromic properties possible. Such gradients can never be attained by use of conventional thermal gradient processes, which are inherently limited to ramp gradients. Since the precise control over photochromic properties in glass with light during isothermal heat treatment has now been made possible through this invention, new applications for gradient photochromic glass bodies of an improved pattern quality other than sunglasses may be concieved.

I claim:

1. A process for manufacturing a precisely controlled photochromic gradient glass body which comprises the steps of:

placing a glass body composed of photochromic or potentially photochromic silver halide-containing glass in a means for heating said body and providing illuminating means which will illuminate selected portions of said body without illuminating the remaining portions subjecting said glass body to an isothermal heat treatment at a temperature sufficient to develop or redevelop the photochromic properties of the glass while illuminating, via said illuminating means, one or more selected portions of the glass body with light of specific intensity and wavelength of 4000–6500 Å so that photochromic activity is arrested at the portions of the body illuminated by said light while said activity is not arrested at remaining portions of the body which are not illuminated by said light, the illuminating means being controlled such that a desired photochromic pattern is formed in said glass body with desired photochromic gradients being imparted.

2. A process as claimed in claim 1, including the further step of continuing heat treatment of the glass isothermally at a temperature and time such that new photochromic properties can be further developed to any degree desired in regions in which photochromism is desired.

* * * * *